(12) United States Patent
Lo et al.

(10) Patent No.: US 6,193,915 B1
(45) Date of Patent: Feb. 27, 2001

(54) PROCESS FOR FABRICATING LOW VOLUME FRACTION METAL MATRIX PREFORMS

(75) Inventors: Jason Sin Hin Lo, Nepean; Raul Santos, Ottawa, both of (CA)

(73) Assignee: Her Majesty the Queen in right of Canada, as represented by the Minister of Natural Resources, Ottawa (CA)

(*) Notice: Subject to any disclaimer, the term of this patent is extended or adjusted under 35 U.S.C. 154(b) by 0 days.

(21) Appl. No.: 09/389,450

(22) Filed: Sep. 3, 1999

(51) Int. Cl.$^7$ .................................................. B29C 65/00
(52) U.S. Cl. .............................. 264/44; 264/43; 264/628; 264/641
(58) Field of Search .................................. 264/42, 43, 44, 264/628, 640, 641

(56) References Cited

U.S. PATENT DOCUMENTS

| | | |
|---|---|---|
| 3,529,655 | 9/1970 | Lawrence . |
| 4,279,289 | 7/1981 | Ban et al. . |
| 4,548,774 | 10/1985 | Akiyama et al. . |
| 4,657,876 | 4/1987 | Hillig . |
| 4,715,422 | 12/1987 | Tommis et al. . |
| 4,800,065 | 1/1989 | Christodoulou et al. . |
| 4,932,099 | 6/1990 | Corwin . |
| 4,995,444 | 2/1991 | Jolly et al. . |
| 5,141,683 | 8/1992 | Hyndman et al. . |
| 5,322,109 | 6/1994 | Cornie . |
| 5,347,426 | 9/1994 | Dermarkar et al. . |
| 5,360,662 | 11/1994 | Wong . |
| 5,409,580 | 4/1995 | Gessing et al. . |
| 5,458,181 | 10/1995 | Corbett et al. . |
| 5,464,583 | 11/1995 | Lessing . |
| 5,571,758 | 11/1996 | Grossman . |
| 5,711,362 | 1/1998 | Rohatgi . |
| 5,765,624 | 6/1998 | Hathaway et al. . |
| 5,791,397 | 8/1998 | Suzuoki et al. . |
| 5,817,432 | 10/1998 | Chwastiak et al. . |
| 5,839,329 | 11/1998 | Smith et al. . |

FOREIGN PATENT DOCUMENTS

| | | |
|---|---|---|
| 852134 | 9/1970 | (CA) . |
| 890809 | 1/1972 | (CA) . |
| 1200674 | 2/1986 | (CA) . |
| 2000770 | 4/1990 | (CA) . |
| 2040499 | 10/1992 | (CA) . |
| 2145161 | 3/1994 | (CA) . |
| 2238520 | 6/1997 | (CA) . |
| 2257081 | 10/1998 | (CA) . |

Primary Examiner—Christopher A. Fiorilla
(74) Attorney, Agent, or Firm—Robert A. Wilkes

(57) ABSTRACT

A process for making a low volume fraction preform for a metal matrix composite including the steps of:

mixing a reinforcement with a binder and sacrificial fillers to provide a castable slurry;

placing the slurry in a mold to provide a green cast preform;

drying the green casting to remove any water and/or solvent;

firing the green preform at a relatively low temperature to burn off the sacrificial fillers;

firing the green preform at an elevated temperature to sinter the binder to bond the reinforcement together. The firing steps include particular combinations of temperature and time to ensure decomposition of the sacrificial filler and sintering without destruction or cracking of the green preform.

9 Claims, No Drawings

PROCESS FOR FABRICATING LOW VOLUME FRACTION METAL MATRIX PREFORMS

BACKGROUND OF THE INVENTION

This invention relates to preforms used in the production of metal matrix composites. In particular, this invention is concerned with low volume fraction preforms used in making metal matrix composites, especially light metal matrix composites of aluminum, magnesium, titanium and their alloys. The preforms of this invention are of particular interest in the pressureless infiltration and squeeze casting processes.

Many articles are formed from cast metal or metal alloys, and in particular from alloys of the so-called light metals, which includes aluminum, magnesium, and alloys thereof which often contain smaller proportions of several other elements. Typical alloying elements for magnesium include aluminum, beryllium, calcium, copper, lithium, manganese, metals from the rare earths group, silicon, silver, thorium, zinc, zirconium and yttrium; typical alloying elements for aluminium include silicon, iron, copper, manganese, magnesium, chromium, nickel, zinc, vanadium, titanium and gallium. Although these alloys are widely used, they do have certain disadvantages. Of particular importance are their inability to resist even moderately elevated temperatures, lack of inherent strength in comparison with metals such as ferrous alloys, and lack of adequate resistance to wear.

A need for lightweight, high strength parts by the aircraft and automotive industries, amongst others, has resulted in the development of reinforced metal matrix composites. In these metal matrix composites, a reinforcing phase is dispersed into the metal matrix, so that the composite more than compensates for the lack of mechanical, physical and other properties in the metal alone. The dispersed phase can be in the form of particles, whiskers, fibres, or, in the case of carbon or graphite fibre reinforcement, it can be tow. The reinforcement can be dispersed into the molten metal using a stir casting technique, or the reinforcement can be prepared as a preform, into which the molten metal is infiltrated, either by pressureless infiltration or by squeeze casting at a pressure of about 100 MPa. When a preform is used it must be capable of surviving the infiltration step more or less undamaged.

Typical procedures for making such composites are described by Lawrence, U.S. Pat. No. 3,529,655; Akiyama et al., U.S. Pat. No. 4,548,774; Tommis et al., U.S. Pat. No. 4,715,422; Corwin, U.S. Pat. No. 4,932,099; Jolly et al., U.S. Pat. No. 4,995,444; Wong, U.S. Pat. No. 5,360,662; Corbett et al., U.S. Pat. No. 5,458,181; Rohatgi, U.S. Pat. No. 5,711,362; Maier et al., CA 2,040,499; and Brown et al., CA 2,238,520. Typical materials used as the reinforcement in metal matrix Composites include the following:

- in the from of fibers: silicon carbide, graphite, carbon, alumina, and mixtures of alumina and silica;
- in the form of whiskers: silicon carbide;
- in the from of tow: carbon and graphite; and
- in a particulate form: silicon carbide, carbon, alumina, titanium diboride, boron carbide and boron nitride.

Although these metal matrix composites do overcome many of the problems associated with a comparable un-reinforced metal product, the metal matrix composites also suffer from several disadvantages which hinder their utilization. The reinforcement materials used, especially in the case of whiskers of material such as silicon carbide, are expensive. The metal matrix composites are often difficult to machine, and in many cases diamond cutting tools are required, thus again increasing manufacturing costs. The ductility properties utilized extensively in fabricating light metals, for example in making extrusions, are either impaired significantly, or effectively lost, if a relatively high volume fraction of reinforcement is used. In this context, the term "volume fraction" refers to the proportion of the volume of the metal matrix composite occupied by the reinforcement; for example, if the reinforcement volume fraction is 25%, one quarter of the volume of the composite comprises reinforcement, and three quarters comprises metal. A further difficulty is that there is a lack of reliable engineering data concerning metal matrix composites containing significant volume fractions of reinforcement, which is needed for structural design purposes.

These difficulties can be overcome to some degree by two expedients. In theory, it is possible to decrease the amount of reinforcement used by reinforcing only a selected part or parts of the metal matrix, for example an area exposed to significant stress, and it is also possible to decrease the amount of reinforcement by using a low volume fraction of reinforcement. By either of these techniques, or a combination of them, it is theoretically possible to fabricate a metal matrix composite product which consists primarily of metal, and in which either only selected regions include the reinforcement, or a relatively small amount of reinforcement sufficient is dispersed throughout the metal matrix, in both cases thereby to provide the required properties in the metal matrix composite. This should reduce the cost of the reinforcement used, and should result in a product that is machinable with conventional tooling, thus again lowering production costs. The structural properties of the metal matrix composite will then also approximate to those of the metal matrix, thus simplifying the design process, as the properties of the metals and alloys used in metal matrix composites are well understood.

There is still however a significant difficulty. In order to be able to use a low volume fraction of reinforcing material, either as a selective reinforcement at a particular locality, such as a point exposed to localised stress or wear, or distributed homogenously throughout a metal matrix, it is necessary to use the reinforcing material as a preform. In this context, the low volume fraction of reinforcing material is desirably typically below about 8% in the case of whisker reinforcement, and below about 15% in the case of particulate reinforcement. It also follows that in addition to corresponding to the required low volume fraction, the finished preform must have sufficient structural strength to be handled, and to survive the metal infiltration process, which often is a squeeze casting step carried out at a pressure of about 100 MPa.

Currently, the are no processes described whereby a reinforcement preform corresponding to this low volume fraction of the composite can be made in which the reinforcement is uniformly distributed. Uneven distribution of the reinforcement within a metal matrix composite, or even within a reinforced portion of a component, is not desirable for several reasons, not the least of which is that the properties of the metal matrix composite, or of the reinforced portion of a larger component, will vary in an unpredictable and largely random fashion.

SUMMARY OF THE INVENTION

This invention seeks to provide a process whereby a low volume fraction preform can be made, wherein the reinforcement comprises either whiskers, fibres, or particulates.

The resulting preform has sufficient strength both to be handled, and to be infiltrated with liquid metal, for example by a squeeze casting process carried out at a pressure of about 100 MPa. In the process of this invention, a particular selection of binder material and sacrificial fillers is used to make the preform, and the preform is solidified by a specific drying and firing technique. In the process of this invention, broadly four steps are involved.

In the first step, the reinforcement is mixed with a binder, and with the sacrificial fillers, to provide a castable slurry. The slurry is then placed in a mould, to provide a green cast preform. In the second step, the green casting is dried, to remove any water and/or solvent remaining from the castable slurry. In the third step, the green preform is fired at a relatively low temperature, to burn off the sacrificial fillers. In the fourth step, the green preform is fired at an elevated temperature sufficiently high to sinter the binder to bond the reinforcement together. In the third and fourth steps particular combinations of temperature and time are used to ensure decomposition of the sacrificial fillers, followed by firing of the binder to sinter it and thus bond the preform together without destruction or cracking of the green preform.

With proper mixing in the first step, and proper control of the drying and firing steps, preforms that are effectively a near-net shape can be fabricated, which have sufficient mechanical strength to be handled with reasonable care. These preforms will also withstand the stresses imposed by the squeeze casting process. With the process of this invention, preforms with a volume fraction of down to at least 15% for particulate, and down to at least 8% for whiskers can be fabricated. With the process of this invention it is therefore possible to fabricate a metal matrix composite containing more than 85% of the matrix metal. It is also possible to fabricate large preforms successfully, with sectional thicknesses up to at least about 5 cms, and a length or diameter up to about 30 cms.

Thus in a first broad embodiment this invention provides a process for fabricating a low volume fraction preform for the fabrication of a metal matrix composite comprising:
  (a) mixing the reinforcement with a combination of sacrificial fillers, a sinterable binder, and sufficient liquid to provide a mouldable slurry;
  (b) placing the mouldable slurry into a preform mould;
  (c) curing the preform in the mould at a temperature and for a time sufficient to provide a dry green preform;
  (d) firing the green preform in a furnace controlled to provide a fired preform under the following combinations of time and temperature as a continuous sequence:
    (i) heating from about 50° C. to about 210° C. at a rate of 30° C. per hour, followed by holding at about 210° C. for about 30 minutes;
    (ii) heating from about 210° C. to about 260° C. at about 10° C. her hour, followed by holding at about 260° C. for 60 minutes;
    (iii) heating from about 260° C. to about 500° C. at 20° C. per hour, followed by holding at about 500° C. for 30 minutes;
    (iv) heating from about 500° C. to about 560° C. at about 10° C. per hour, followed by holding at about 560° C. for 30 minutes;
    (v) heating from about 560° C. to about 1,100° C. at 100° C. per hour, followed by holding at about 1,100° C. for 4 hours; and
    (vi) cooling slowly to ambient temperature.
Preferably, the initial curing in step (c) is carried out at about 50° C. over a time period of about 18 hours.

Preferably, the final cooling step is carried out by allowing the fired preform to cool in the furnace.

Preferably, the firing time and temperature continuous sequence of step (d) is carried out in a programmable furnace.

Preferably, the reinforcement used is chosen from at least one member of the group consisting of silicon carbide, carbon, graphite, boron carbide, boron nitride, titanium diboride, silica, alumina, and mixtures of alumina and silica.

Preferably, the reinforcement used is in a physical form chosen from at least one of the group consisting of particulate, fibre, tow, whisker, and mixtures thereof.

The sacrificial fillers and binders are chosen to achieve essentially three goals. First, the fillers ensure that both the reinforcement and the binders are uniformly distributed within the green preform. Second, the green preform after drying must have enough mechanical strength to survive a reasonable degree of handling. Third, the sacrificial fillers when subjected to the combinations of time and temperature of the firing sequence up to about at least 560° C. decompose smoothly and evenly, without any distortion, collapse, cracking or other disruption of the green preform.

Typical examples of the sacrificial fillers are as follows:
  cellulosic materials: corn starch; and
  inert plastics materials: powdered polyolefin, for example powdered polypropylene.

Cellulosic materials such as corn starch also aid in distributing the solid reinforcement material evenly throughout the slurry from which the green preform is cast, and also in providing a stable slurry.

Typical examples of sacrificial binders are castable polymers, such as the well known peroxide catalysed polyester resins.

Typical examples sinterable non-sacrificial binder are: powdered silica, colloidal silica, powdered alumina, colloidal alumina, silica-alumina mixtures which may be made by admixing the two components or by using a mineral source containing both. Other possible sinterable non-sacrificial binders include monomagnesium phosphate, monoaluminium phosphate, and magnesium fluoride.

Some care must also be given to the mould used for the preform casting step. This should be designed in such a way that the green preform can be dried slowly and evenly, thus avoiding deformation and cracking. Conveniently, a porous mould can be used. After the preform is cast, it is subjected to an initial relatively low temperature drying step, in which the liquids, mainly water, used in making the initial castable mixture are removed. The drying conditions are chosen such that the casting dries out evenly and thoroughly, without cracking or deformation. With a castable mixture in which water is the main liquid, a slow drying process carried out in a ventilated low temperature oven held at about 50° C., and a shorter drying process carried out in a ventilated oven at about 150° C., have both been found to be satisfactory. Large green preforms may require a longer time period.

EXAMPLE 1.

A volume fraction of 25% of reinforcement was prepared from the following materials:

| | |
|---|---|
| silicon carbide powder | 100 g. |
| powdered polypropylene | 15 g. |
| polyester resin | 6 g. |
| resin catalyst | 4 g. |

| | |
|---|---|
| corn starch | 15 g. |
| alumina powder | 5 g. |
| colloidal silica | 15 g. |

The polyester resin and catalyst used were so-called "warm box binder" and "warm box catalyst" available from Ashland Chemicals; other peroxide catalysed resin systems are freely available. The colloidal silica used is freely available as an aqueous suspension. The materials were then mixed to provide a wetted paste which can be formed into the preform porous mold. For more complex mould shapes, vibration or pressure can be applied to the wetted paste to assist in filing all of the mould. Enough liquid is used to ensure that the mixture will completely fill all of the cavities of the preform mold. The amount of liquid can be adjusted to obtain the desired consistency in the mixture either by altering the quantity of colloidal silica used, or by adding water. It is also contemplated that more than one preform can be cast in the mould simultaneously.

The porous mold containing the mixture was initially dried in a low temperature oven at 150° C. for about 2 hours. It was then fired in an oven programmed to provide the specified sequence of time and temperature combinations. The resulting preform was found to be physically strong enough to withstand reasonable handling, and also to survive a squeeze casting step to infiltrate it with molten aluminum alloy to provide an aluminum alloy based metal matrix composite.

EXAMPLE 2.

A whisker preform corresponding to a volume fraction of 10% reinforcement was prepared from the following materials:

| | |
|---|---|
| silicon carbide whiskers: | 100 g |
| powdered polypropylene: | 50 g |
| corn starch | 50 g |
| colloidal silica | 45 g |

The materials were mixed together and wetted with the colloidal silica binder to provide a pourable slurry that will fill all of the cavities of a porous preform mould. The consistency of the mixture is adjusted if necessary either by altering the amount of colloidal silica, or by adding water. The porous mould containing the mixture was dried in a low temperature oven at 50° C. for about 18 hours. The green preform was then fired in a furnace programmed to provide the specified sequence of time and temperature combinations. The resulting preform was found to be physically strong enough to withstand reasonable handling, and also to survive a squeeze casting step to infiltrate it with molten aluminum alloy to provide an aluminum alloy based metal matrix composite.

We claim:

1. A process for fabricating a low volume fraction preform from a reinforcement for the fabrication of a metal matrix composite comprising:

(a) mixing the reinforcement with a combination of sacrificial fillers, a sinterable binder, and sufficient liquid to provide a mouldable slurry;

(b) placing the mouldable slurry into a preform mould;

(c) curing the mouldable slurry in the preform mould at a temperature and for a time sufficient to provide a dry green preform;

(d) firing the green preform in a. furnace controlled to provide a fired preform under the following combinations of time and temperature as a continuous sequence:

(i) heating from about 50° C. to about 210° C. at a rate of 30° C. per hour, followed by holding at about 210° C. for about 30 minutes;

(ii) heating from about 210° C. to about 260° C. at a rate of 20° C. per hour, followed by holding at about 260° C. for 60 minutes;

(iii) heating from about 260° C. to about 500° C. at a rate of 20° C. per hour, followed by holding at about 500° C. for 30 minutes;

(iv) heating from about 500° C. to about 560° C. at a rate of 10° C. per hour, followed by holding at about 560° C. for 30 minutes;

(v) heating from about 560° C. to about 1,100° C. at a rate of 100° C. per hour, followed by holding at about 1,100° C. for 4 hours; and (vi) cooling slowly to ambient temperature.

2. A process according to claim 1 wherein the curing in step (c) is carried out at about 50° C. over a time period of about 18 hours.

3. A process according to claim 1 wherein the curing in step (c) is carried out at about 150° C. over a time period of about 2 hours.

4. A process according to claim 1 wherein the cooling in part (vi) of step (d) is carried out by allowing the fired preform to cool in the furnace.

5. A process according to claim 1 wherein the firing time and temperature sequence of step (d) is carried out in a programmed reference.

6. A process according to claim 1 wherein the reinforcement used is chosen from at least one member of the group consisting of silicon carbide, carbon, graphite, boron carbide, boron nitride, titanium diboride, silica, alumina and mixtures of alumina and silica.

7. A process according to claim 1 wherein the reinforcement used is in a physical form chosen from at least one of the group consisting of particulate, fiber, tow, whisker, and mixtures thereof.

8. A process according to claim 1 wherein in step (b) placement of the mouldable slurry into the mould is assisted by the use of vibration.

9. A process according to claim 1 wherein in step (b) placement of the mouldable slurry into the mould is assisted by the use of pressure.

* * * * *